(12) United States Patent
Wiley et al.

(10) Patent No.: US 9,680,324 B2
(45) Date of Patent: Jun. 13, 2017

(54) ENERGY HARVESTING DAMPER CONTROL AND METHOD OF OPERATION

(71) Applicant: RUSKIN COMPANY, Grandview, MO (US)

(72) Inventors: Josiah Wiley, Kansas City, MO (US); Edward Neal Koop, Olathe, KS (US)

(73) Assignee: RUSKIN COMPANY, Grandview, MO (US)

( * ) Notice: Subject to any disclaimer, the term of this patent is extended or adjusted under 35 U.S.C. 154(b) by 130 days.

(21) Appl. No.: 14/641,157

(22) Filed: Mar. 6, 2015

(65) Prior Publication Data
US 2016/0258639 A1  Sep. 8, 2016

(51) Int. Cl.
| H02K 7/14 | (2006.01) |
| F04D 15/00 | (2006.01) |
| H02J 7/00 | (2006.01) |
| F24F 5/00 | (2006.01) |

(52) U.S. Cl.
CPC ............ *H02J 7/007* (2013.01); *F24F 5/0021* (2013.01); *H02J 7/0029* (2013.01); *Y02E 60/147* (2013.01)

(58) Field of Classification Search
CPC ...... H02J 7/345; H02J 17/00; H02J 2001/004; H02J 7/0024; H02J 7/35; H02J 13/0075; H02J 1/102; H02J 2003/143; H02J 2003/146; H02J 2007/0037; H02J 2007/004; H02J 3/14; H02J 7/0032; H02J 1/108
USPC ................................ 318/3, 16, 446; 236/49.3
See application file for complete search history.

(56) References Cited

U.S. PATENT DOCUMENTS

| 4,417,687 | A | 11/1983 | Grant |
| 5,251,815 | A * | 10/1993 | Foye ............... G05D 7/0635 236/49.3 |
| 6,363,736 | B1 | 4/2002 | Kunkel et al. |
| 6,431,127 | B2 * | 8/2002 | Weber .................. 123/41.12 |
| 7,667,376 | B2 | 2/2010 | Schmidt |
| 7,692,411 | B2 * | 4/2010 | Trainor ............. H01M 10/46 307/109 |

(Continued)

FOREIGN PATENT DOCUMENTS

| JP | S54-41562 A | 4/1979 |
| KR | 2015-0030879 A | 3/2015 |

(Continued)

OTHER PUBLICATIONS

The International Search Report and Written opinion issued by European Patent Office on Oct. 25, 2016 for PCT patent application No. PCT/US2016/028123.

(Continued)

*Primary Examiner* — Paul Ip
(74) *Attorney, Agent, or Firm* — Jackson Walker LLP; Christopher J. Rourk (57) ABSTRACT

A system for controlling a damper, comprising an energy harvesting device is disclosed. A voltage conditioning and storage unit coupled to the energy harvesting device, the voltage conditioning and storage unit configured to apply overvoltage and undervoltage protection to a storage capacitor. A controller coupled to the voltage conditioning and storage unit, the voltage conditioning and storage unit configured to apply overvoltage protection to the controller.

19 Claims, 2 Drawing Sheets

(56) References Cited

U.S. PATENT DOCUMENTS

| | | | | |
|---|---|---|---|---|
| 7,781,943 B1* | 8/2010 | Hamel | H02N 2/181 | 310/339 |
| 7,808,127 B2* | 10/2010 | Teggatz | H02J 7/0055 | 307/72 |
| 7,830,072 B2 | 11/2010 | Schmidt | | |
| 7,864,507 B2* | 1/2011 | Fleig | H01G 9/016 | 361/502 |
| 7,884,727 B2* | 2/2011 | Tran | A61B 5/0006 | 307/117 |
| 7,982,439 B2* | 7/2011 | Trainor | H01M 10/46 | 307/109 |
| 8,086,352 B1* | 12/2011 | Elliott | F24F 11/0009 | 700/275 |
| 8,142,265 B2* | 3/2012 | Carter | F24F 13/12 | 454/289 |
| 8,228,151 B2 | 7/2012 | Schmidt | | |
| 8,249,731 B2* | 8/2012 | Tran | A61B 5/002 | 222/23 |
| 8,350,519 B2* | 1/2013 | Brantner | H02J 7/0032 | 320/101 |
| 8,400,258 B2* | 3/2013 | Aikens | G05B 19/042 | 340/12.23 |
| 8,531,047 B2 | 9/2013 | Schmidt et al. | | |
| 8,550,370 B2* | 10/2013 | Barrett | B60H 1/00871 | 236/91 D |
| 8,621,245 B2* | 12/2013 | Shearer | G06K 19/0707 | 340/539.26 |
| 9,197,143 B1* | 11/2015 | Townsend | H02J 1/108 | |
| 2001/0025610 A1* | 10/2001 | Weber | F01P 7/04 | 123/41.12 |
| 2003/0052180 A1* | 3/2003 | Huhn | G05B 19/042 | 236/49.3 |
| 2004/0159713 A1* | 8/2004 | Schmidt | F24F 11/053 | 236/49.3 |
| 2005/0040782 A1* | 2/2005 | Jasinski | B60H 1/00835 | 318/446 |
| 2005/0087616 A1* | 4/2005 | Attridge | F24F 3/044 | 236/91 D |
| 2005/0144963 A1* | 7/2005 | Peterson | F24F 11/0001 | 62/178 |
| 2005/0258259 A1* | 11/2005 | Stanimirovic | F24F 11/0086 | 236/49.1 |
| 2005/0270151 A1* | 12/2005 | Winick | F24F 11/0086 | 340/539.1 |
| 2005/0278069 A1* | 12/2005 | Bash | F24F 11/0009 | 700/276 |
| 2006/0281435 A1* | 12/2006 | Shearer | G06K 19/0707 | 455/343.1 |
| 2006/0286918 A1* | 12/2006 | Vargas | B60H 1/00871 | 454/155 |
| 2007/0176758 A1* | 8/2007 | Bokusky | H02P 3/02 | 340/425.5 |
| 2007/0182362 A1* | 8/2007 | Trainor | H01M 10/46 | 320/101 |
| 2008/0009237 A1* | 1/2008 | Wu | F24F 11/0009 | 454/256 |
| 2008/0033599 A1* | 2/2008 | Aminpour | F24F 11/006 | 700/276 |
| 2008/0083446 A1* | 4/2008 | Chakraborty | H01L 35/30 | 136/205 |
| 2008/0093446 A1* | 4/2008 | Tomita | G07C 9/00103 | 235/382 |
| 2009/0065595 A1* | 3/2009 | Kates | F24F 3/0442 | 236/49.3 |
| 2009/0102296 A1* | 4/2009 | Greene | H01Q 1/248 | 307/149 |
| 2009/0168305 A1* | 7/2009 | Fleig | H01G 9/016 | 361/528 |
| 2009/0251099 A1* | 10/2009 | Brantner | H02J 7/0032 | 320/101 |
| 2009/0258591 A1* | 10/2009 | Carter | F24F 13/12 | 454/309 |
| 2010/0026100 A1* | 2/2010 | Teggatz | H02J 7/0055 | 307/82 |
| 2010/0060231 A1* | 3/2010 | Trainor | H01G 11/14 | 320/103 |
| 2010/0090656 A1* | 4/2010 | Shearer | G06K 19/0707 | 320/139 |
| 2010/0139306 A1* | 6/2010 | Krenik | F25B 9/004 | 62/402 |
| 2010/0163633 A1* | 7/2010 | Barrett | B60H 1/00871 | 236/49.3 |
| 2010/0277270 A1* | 11/2010 | Aikens | G05B 19/042 | 340/3.7 |
| 2010/0315046 A1* | 12/2010 | Trainor | H01M 10/46 | 320/167 |
| 2011/0034120 A1* | 2/2011 | Jaiyeola | F24F 11/006 | 454/335 |
| 2011/0077758 A1* | 3/2011 | Tran | A61B 5/002 | 700/94 |
| 2011/0105004 A1* | 5/2011 | Browne | B60H 1/00421 | 454/75 |
| 2011/0109102 A1* | 5/2011 | McCoy | F03G 7/08 | 290/1 R |
| 2011/0115222 A1* | 5/2011 | Parker | H02N 2/181 | 290/7 |
| 2011/0158806 A1* | 6/2011 | Arms | F03D 1/0658 | 416/31 |
| 2011/0172828 A1* | 7/2011 | Schmidt | F24F 5/0042 | 700/276 |
| 2011/0208450 A1* | 8/2011 | Salka | H01H 9/167 | 702/62 |
| 2011/0269389 A1* | 11/2011 | Scharf | F24F 13/1426 | 454/258 |
| 2012/0068669 A1* | 3/2012 | Trainor | H01M 10/46 | 320/167 |
| 2012/0072030 A1 | 3/2012 | Elliott | | |
| 2012/0256492 A1* | 10/2012 | Song | H02J 1/102 | 307/66 |
| 2013/0013120 A1 | 1/2013 | Sabripour | | |
| 2013/0024029 A1* | 1/2013 | Tran | A61B 5/1113 | 700/278 |
| 2013/0082115 A1* | 4/2013 | May | F24F 13/1426 | 236/49.3 |
| 2013/0181689 A1* | 7/2013 | Ocalan | H02P 9/006 | 322/2 R |
| 2013/0201316 A1* | 8/2013 | Binder | H04L 67/12 | 348/77 |
| 2013/0217294 A1* | 8/2013 | Karunaratne | A63H 33/22 | 446/90 |
| 2013/0328416 A1* | 12/2013 | Whitworth | H02J 50/05 | 307/149 |
| 2014/0111032 A1* | 4/2014 | Shearer | G06K 19/0707 | 307/149 |
| 2014/0222216 A1* | 8/2014 | Chen | F24F 11/04 | 700/276 |
| 2014/0330438 A1* | 11/2014 | Haines | G05B 15/02 | 700/276 |
| 2016/0007525 A1* | 1/2016 | Drew | A01D 34/006 | 56/10.2 R |

FOREIGN PATENT DOCUMENTS

| | | |
|---|---|---|
| RU | 2538514 C1 | 1/2015 |
| WO | 2014/018304 | 1/2014 |

OTHER PUBLICATIONS

The invitation to pay additional fees and, where applicable, protest fee mailed by European Patent Office on Jul. 25, 2016 for PCT patent application No. PCT/US2016/028123.

* cited by examiner

ENERGY HARVESTING DAMPER CONTROL AND METHOD OF OPERATION

TECHNICAL FIELD

The present disclosure relates generally to heating, ventilation and air conditioning (HVAC) equipment, and more specifically to an energy harvesting damper control and method of operation.

BACKGROUND OF THE INVENTION

HVAC equipment is used to distributed conditioned air throughout a building, such as to heat or cool the building, to exchange stale air for fresh air or for other purposes. However, controlling the flow of the conditioned air typically requires extensive control and electric power cabling networks, which increases the installation cost of HVAC equipment.

SUMMARY OF THE INVENTION

A system for controlling a damper is provided that includes an energy harvesting device, such as a Peltier effect device. A voltage conditioning and storage unit is connected to the energy harvesting device, and applies overvoltage and undervoltage protection to a storage capacitor. A controller is connected to the voltage conditioning and storage unit, and applies overvoltage protection to the controller.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

In the description that follows, like parts are marked throughout the specification and drawings with the same reference numerals. The drawing figures might not be to scale and certain components can be shown in generalized or schematic form and identified by commercial designations in the interest of clarity and conciseness.

Figure 1:
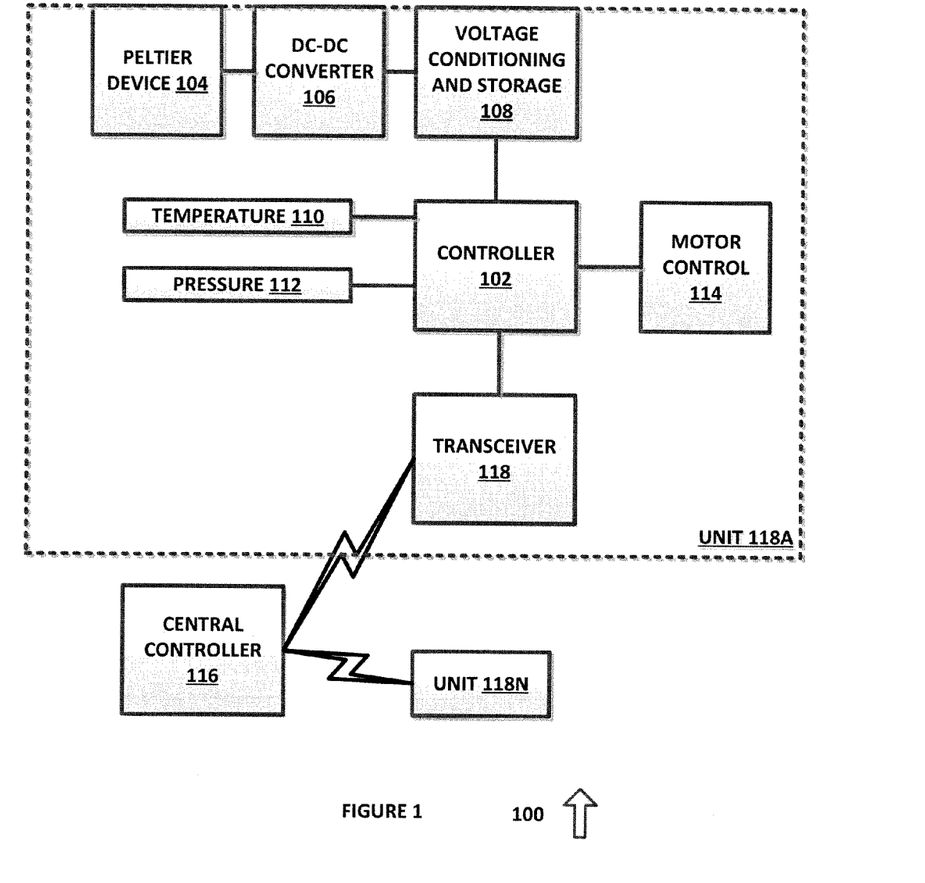
FIG. 1 is a diagram of a system for an energy harvesting damper control, in accordance with an exemplary embodiment of the present disclosure.

FIG. 1 is a diagram of a system 100 for an energy harvesting damper control, in accordance with an exemplary embodiment of the present disclosure. System 100 includes controller 102, Peltier device 104, DC to DC converter 106, voltage conditioning and storage 108, temperature sensor 110, pressure sensor 112, motor control 114, transceiver 118 and central controller 116, which can be implemented in hardware or in suitable combination of hardware and software.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor includes a microcomputer or other suitable controller, memory devices, input-output devices, displays, data input devices such as a keyboard or a mouse, peripherals, associated drivers, control cards, power sources, network devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

Controller 102 can be a suitable controller for use with energy harvesting applications, such as an STM 300 energy harvesting wireless sensor module, available from Enocean of Munich, Germany, or other suitable controllers. Controller 102 is coupled to voltage conditioning and storage 108, temperature sensor 110, pressure sensor 112, motor control 114 and transceiver 118, and coordinates system operation of these and other suitable components of system 100. Controller 102 can be used to control a position of a damper or other suitable HVAC or building management equipment, without the need for power, control or instrumentation cabling. A plurality of controllers 102 can be disposed around the building and the HVAC system, to provide wireless control of building energy consumption and HVAC settings.

Peltier device 104 generates electrical energy as a function of a temperature difference between an ambient temperature environment outside of an HVAC duct, and conditioned air contained within the HVAC duct. In one exemplary embodiment, Peltier device 104 can be configured to generate electrical energy if the ambient temperature environment is hotter or colder than the conditioned air, such as to allow Peltier device to generate electrical energy when the ambient environment is hot and the conditioned air is cold, or when the ambient environment is cold and the conditioned air is hot. Likewise, other suitable devices can also or alternatively be used instead of Peltier device 104, such as a Seebeck effect device, a Thompson effect device, a microturbine or other suitable devices.

DC to DC converter 106 receives direct current electrical energy at a low voltage, such as 20 mV, and converts the voltage to a higher voltage, such as 3 to 4 Volts. In one exemplary embodiment, the output of DC to DC converter 106 can be selected to prevent damage to an energy storage capacitor, controller 102 and other devices, such as due to overvoltage, undervoltage or other conditions. In this exemplary embodiment, if the energy storage capacitor is a 40 Farad capacitor with a rated operating voltage of 3.8 volts, then a design voltage output for DC to DC converter 106 can be selected to be no greater than 3.8 volts.

Voltage conditioning and storage 108 provides overvoltage and undervoltage protection for the components of system 100, provides energy storage and performs other suitable functions. In one exemplary embodiment, if the energy storage capacitor is a 40 Farad capacitor with a rated operating voltage of 3.8 volts, then the overvoltage protection for the energy storage capacitor can be set to limit the charging voltage to a lower level, such as 3.6 volts. Likewise, the undervoltage protection can be set to prevent discharging the energy storage capacitor to less than 2.2 volts, such as to prevent damage to the energy storage capacitor, and other suitable protection can be provided.

Temperature sensor 110 is used to measure the temperature of the air contained with an HVAC duct, the ambient air temperature and to perform other suitable temperature measurements. In one exemplary embodiment, temperature sensor 110 can be a resistive temperature detector (RTD), a thermistor, a thermocouple, other suitable devices, a combination of devices, an array of devices or other suitable temperature sensing devices or arrangements.

Pressure sensor 112 is used to measure the pressure differential between the inside and outside of a duct, the pressure differential across a section of ductwork or other suitable pressure differentials. In one exemplary embodiment, pressure sensor 112 can be a differential pressure sensor, a piezo-resistive strain gauge pressure sensor, a capacitive pressure sensor, an electromagnetic pressure sensor, a piezoelectric pressure sensor, an optical pressure sensor, a potentiometric pressure sensor, a resonant pressure sensor, a thermal pressure sensor, an ionization pressure sensor, other suitable devices, a combination of devices, an array of devices or other suitable pressure sensing devices or arrangements.

Motor control 114 is used to control a motor for adjusting the position of a damper, such as to open or close the damper, to determine the position of the damper and for other suitable purposes. In one exemplary embodiment, motor control 114 can include motor current sensors, motor voltage sensors, motor position sensors, motor actuators and other suitable devices.

Central controller 116 communicates with a large number of controllers 102 and its associated components, which each form a unit 118A through 118N, and which are each installed at locations where a controllable damper is located in the HVAC system for a building. In this manner, central control 116 can receive temperature and pressure data from each of the plurality of controllers, as well as temperature data associated with each of a plurality of rooms, hallways or other building structures that receive conditioned air from the HVAC system, and can determine whether a damper position needs to be changed to increase or decrease a temperature in a room, hallway or other building location, to increase or reduce a flow of conditioned air based on scheduled occupancy estimates, or to otherwise control the flow of conditioned air.

Transceiver 118 sends wireless data from controller 102 to central controller 116 and receives wireless data from central controller 116 for controller 102. In one exemplary embodiment, central controller 116 can periodically transmit data to transceiver 118 that causes controller 102 to transition from a low power state to a high power state, to read a pressure measurement from pressure sensor 112, to read a temperature measurement from temperature sensor 110, to transmit the pressure and temperature data to central controller 116, to receive damper configuration data from central controller 116, to change a position of a damper associated with motor control 114, and to perform other suitable functions.

In operation, system 100 allows damper settings and other settings of an HVAC system to be remotely controlled, and uses Peltier effect energy recovery or other suitable energy recovery to provide power for the dampers or other HVAC equipment. System 100 thus eliminates the need for running electrical power, signaling and control cabling to distributed points of a building or HVAC system, by utilizing local electric power generation and storage.

Figure 2:
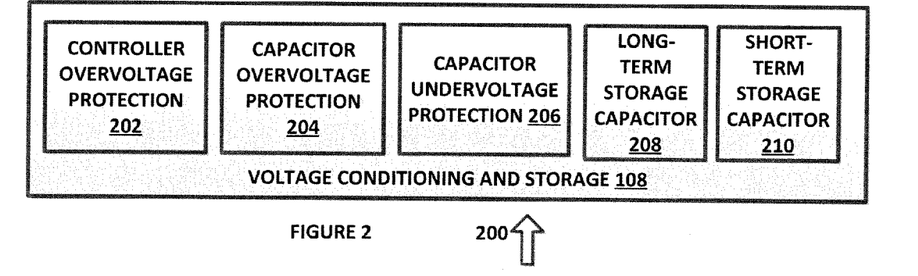
FIG. 2 is a diagram of a system for voltage conditioning and storage, in accordance with an exemplary embodiment of the present disclosure.

FIG. 2 is a diagram of a system 200 for voltage conditioning and storage, in accordance with an exemplary embodiment of the present disclosure. System 200 includes controller overvoltage protection 202, capacitor overvoltage protection 204, capacitor undervoltage protection 206, long term storage capacitor 208 and short term storage capacitor 210, each of which can be implemented in hardware or a suitable combination of hardware and software (other than discrete components).

Controller overvoltage protection 202 provides overvoltage protection for a controller, such as an STM 300 energy harvesting wireless sensor module, available from Enocean of Munich, Germany, or other suitable controllers. In one exemplary embodiment, controller overvoltage protection 202 can limit the voltage provided to the controller to a maximum of 4.2 volts, such as by using a 10 microfarad capacitor in parallel with the controller to monitor the voltage that is being applied to the controller, and by isolating the controller from the voltage source (such as DC to DC converter 106 or other suitable voltage sources) if the voltage exceeds the maximum voltage, or in other suitable manners.

Capacitor overvoltage protection 204 provides overvoltage protection for an energy storage capacitor, such as a 40 Farad capacitor with a rated operating voltage of 3.8 volts. In this exemplary embodiment, a 100 nanofarad capacitor in parallel with the energy storage capacitor can be used to monitor the voltage that is being applied to the energy storage capacitor, and by isolating the capacitor from the voltage source (such as DC to DC converter 106 or other suitable voltage sources) if the voltage exceeds the maximum voltage, or in other suitable manners.

Capacitor undervoltage protection 206 provides undervoltage protection for an energy storage capacitor, such as a 40 Farad capacitor with a rated operating voltage of 3.8 volts. In this exemplary embodiment, a 100 nanofarad capacitor connected between a base and a collector of a bipolar junction transistor or other suitable devices can be used to turn off a switch between the energy storage capacitor and the load (such as controller 102 or other suitable loads) if the voltage falls below the minimum voltage, or in other suitable manners.

Long term storage capacitor 208 is used to store electrical energy that is recovered or harvested from a local device, such as a Peltier effect device, a Seebeck effect device, a Thompson effect device, a micro turbine or other suitable devices. In one exemplary embodiment, long term storage capacitor 208 can be a 40 Farad capacitor with a rated operating voltage of 3.8 volts, or other suitable storage capacitors.

Short term storage capacitor 210 is used to provide energy to controller 102 or other loads when the voltage of long term storage capacitor 208 is lower than an allowable threshold. In one exemplary embodiment, short term storage capacitor 210 can be used to allow for faster recharging when long term storage capacitor 208 is discharged but when controller 102 is in operation, such as during an operational period between ten minute quiescent periods. For example, controller 102 can transition from a quiescent period to an active period to measure a pressure and temperature reading, to transmit the pressure and temperature reading to a central controller, to receive a new damper position from the central controller and to actuate a motor to move the damper to the new damper position, during which time long term storage capacitor 208 is discharged. If the charging rate of long term storage capacitor 208 is too slow to allow it to be recharged sufficiently to complete the damper positioning, short term storage capacitor 210 can be used instead, to allow a sufficient charge to be stored to complete the damper positioning and to allow controller 102 to transition to the quiescent state.

In operation, system 200 allows energy from a local environmental energy source to be used to charge a storage capacitor and to power a controller, for remote monitoring of temperature and pressure and remote operation of a motor controller. System 200 provides over- and under-voltage protection to energy storage capacitors, controllers, and other suitable devices.

Figure 3:
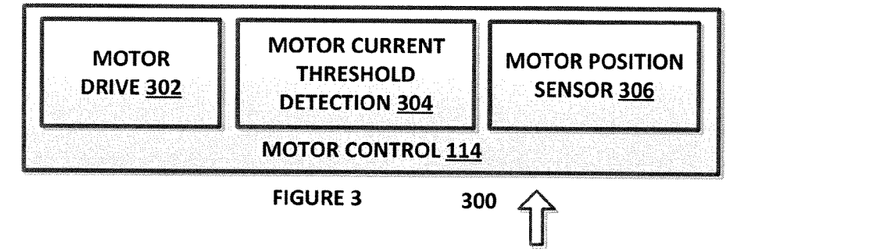
FIG. 3 is a diagram of a system for motor control, in accordance with an exemplary embodiment of the present disclosure.

FIG. 3 is a diagram of a system 300 for motor control, in accordance with an exemplary embodiment of the present disclosure. System 300 includes motor drive 302, motor current threshold detection 302 and motor position sensor 306, each of which can be implemented in hardware or a suitable combination of hardware and software.

Motor drive 302 receives voltage and current from a controller and actuates a motor, such as a stepper motor, a DC motor or other suitable motors. In one exemplary embodiment, the amount of current required to cause the motor to increment a single step can be provided, such as to cause a damper attached to the motor to open or close by a predetermined amount.

Motor current threshold detection 302 receives motor current measurement data and determines whether the motor current measurement data exceeds a predetermined threshold. In one exemplary embodiment, if a damper connected to the motor reaches the fully open or fully closed position, such that it can no longer move in a given direction, continued application of torque from the motor can result in an increase in current drawn by the motor, such that the position of the damper can be determined by such excessive currents. If it is determined that the motor current has exceeded the threshold, then the direction of rotation of the motor and motor position data can be used to index the position as fully open or fully closed, as suitable.

Motor position sensor 306 receives sensor data, such as from a Hall sensor attached to a motor shaft or in other suitable manners, and generates motor position tracking data. In one exemplary embodiment, a damper attached to a motor may have a predetermined number of positions between a fully open position and a fully closed position, such that motor position sensor 306 can track the damper position by measuring and storing the number of steps taken from the fully open position towards the fully closed position, from the fully closed position towards the fully open position, the number of Hall sensor movements, or in other suitable manners.

Figure 4:
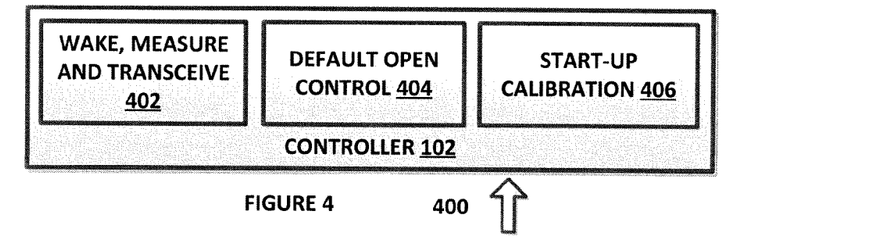
FIG. 4 is a diagram of a system for station control, in accordance with an exemplary embodiment of the present disclosure.

FIG. 4 is a diagram of a system 400 for station control, in accordance with an exemplary embodiment of the present disclosure. System 400 includes controller 102 and wake, measure and transceive system 402, default open control 404 and start-up calibration control 406, each of which can be implemented in hardware or a suitable combination of hardware and software.

Wake, measure and transceive system 402 causes controller 102 to activate from a low power state, to measure data from pressure sensors, temperature sensors and other suitable sensors, and to transmit the measured data to a central controller. Controller 102 then waits for a wireless confirmation data message from the central controller before re-entering the low power mode. In one exemplary embodiment, the wireless confirmation data message can include instructions to move a stepper motor associated with a damper by a predetermined number of steps, to move a DC motor by a predetermined number of Hall sensor measurement increments or to otherwise move a motor associated with a damper, such as to incrementally open or close the damper to adjust a flow of conditioned air through a duct or other structure. In one exemplary embodiment, wake, measure and transceive system 402 can receive a message from a central controller that causes wake, measure and transceive system 402 to activate controller 102, wake, measure and transceive system 402 can include one or more independent timer circuits, or other suitable processes can also or alternatively be used.

Default open control 404 monitors data communications received from a central controller and determines whether data is being received from the central controller. If no data is being received, then default open control 404 causes an associated damper to open. In one exemplary embodiment, default open control 404 can also cause the damper to open if the amount of stored energy remaining in a storage capacitor reaches a minimum level, or can perform other suitable functions.

Start-up calibration control 406 causes controller 102 to generate motor control commands to actuate a stepper motor or other suitable motors to move an associated damper through a range of motion, such as to determine a fully open position, a fully closed position, a number of Hall sensor measurements between the fully open and fully closed position, a number of motor steps between a fully open and a fully closed position, and other suitable data. In one exemplary embodiment, start-up calibration control 406 can be activated when a controller 102 is first powered up, after a service is performed or in other suitable manners.

Figure 5:
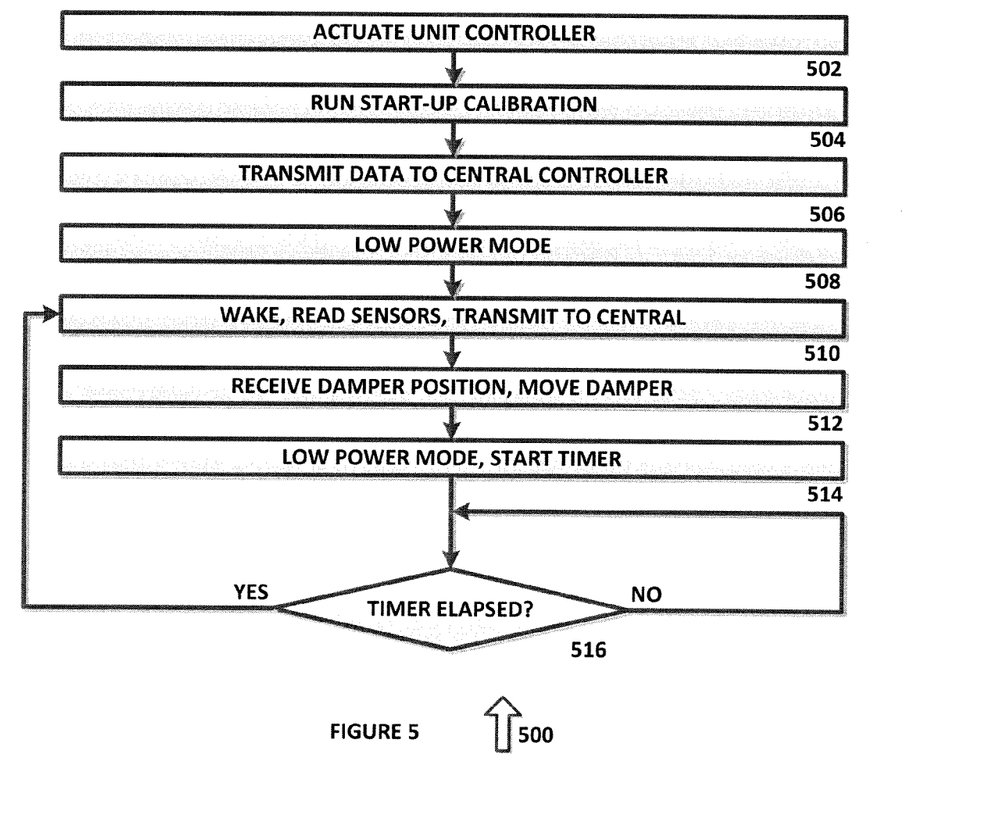
FIG. 5 is a diagram of an algorithm for station control, in accordance with an exemplary embodiment of the present disclosure.

FIG. 5 is a diagram of an algorithm 500 for station control, in accordance with an exemplary embodiment of the present disclosure. Algorithm 500 can be implemented in hardware or a suitable combination of hardware and software, and can be one or more algorithms operating on an STM 300 controller or other suitable controllers.

Algorithm 500 begins at 502, where a unit controller is actuated. In one exemplary embodiment, the unit controller can be turned on by an installer, and a message can be transmitted from the unit controller to determine whether a central controller is available. The algorithm then proceeds to 504.

At 504, a start-up calibration process is implemented. In one exemplary embodiment, the start-up calibration process can cause a motor associated with the unit controller to move in a first direction, such as an opening direction, until a current increase is measured that indicates that a damper associated with the motor has reached a first position, such as a fully open position. The start-up calibration process can then cause the motor to move in the opposite direction, until a current increase is measured that indicates that a damper associated with the motor has reached a second position, such as a fully closed position. Associated data, such as a number of stepper motor steps, a number of Hall effect sensor measurements or other suitable data can also be measured, stored or otherwise processed. The algorithm then proceeds to 506.

At 506, the measured data is transmitted to a central controller. In one exemplary embodiment, the unit controller can listen for messages from the central controller and can transmit a responsive message, the unit controller can transmit an "I am here" message and the central controller can send an acknowledgment message in response, or other suitable wireless data transmission protocols can be used. After communications between the unit controller and the central controller have been established, the unit controller transmits sensor data (such as temperature sensor data and pressure sensor data), damper position data and other suitable data, and the algorithm proceeds to 508.

At 508, the unit controller enters a low power mode, such as by shutting off power to all systems other than a system that is used to operate a timer, a system that is used to listen for wireless data messages or other suitable systems. In addition, the timer can be activated or other suitable processes can also or alternatively be performed. The algorithm then proceeds to 510.

At 510, the unit controller transitions from low power to high power mode, reads sensor data and transmits the sensor data to a central controller. In one exemplary embodiment, the unit controller can have a local timer mechanism that is used to determine a suitable low power mode period, such as 10 minutes, after which the unit controller transition is activated. In another exemplary embodiment, a transceiver can listen for a message from the central controller to activate the transition from low power mode to high power mode, or other suitable processes can also or alternatively be used. The algorithm then proceeds to 512.

At 512, damper position data is received at the unit controller from the central controller, and the unit controller causes a motor to activate so as to move the damper to a new position, if needed. In one exemplary embodiment, the central controller can receive damper position data, temperature data, pressure data and other suitable data from points along ductwork throughout an HVAC system, chiller or heater load data, room temperature and thermostat setting data or other suitable data, and can determine whether a damper position for a damper associated with the unit controller should be changed, such as to increase or decrease an amount of conditioned air that is available to rooms downstream from the damper, to reduce conditioned air flow to rooms that are not occupied or for other suitable purposes. The algorithm then proceeds to 514.

At 514, the unit controller transitions back to low power mode, and a timer is actuated. In one exemplary embodiment, the timer can be a local time, a timer at a central controller or other suitable timers. In addition, other suitable processes can also or alternatively be implemented to transition from a high power mode to a low power mode. The algorithm then proceeds to 516.

At 516, it is determined whether a predetermined period of time has elapsed. In one exemplary embodiment, a value from a local timer can be compared with a value stored in memory to determine whether the current time is past the stored time. Likewise, a central timer can be used to determine whether an activation data message should be transmitted to the unit controller, or other suitable processes can also or alternatively be used. If it is determined that the predetermined period of time has not elapsed, the algorithm returns to 516, otherwise the algorithm returns to 510.

In operation, algorithm 500 allows a unit controller to transition between a high power mode and a low power mode in order to conserve energy, such as where the controller is powered from a local energy capture device. Algorithm 500 allows the time between high power operation periods to be selected as a function of the amount of time required to recharge a storage capacitor or other devices, such as to ensure that sufficient energy is available to operate a motor control for a damper and to perform other operations. Although algorithm 500 is shown as a flow chart, a state diagram, object oriented programming techniques or other suitable processes can also or alternatively be used.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for controlling a damper, comprising:
   an energy harvesting device;
   a voltage conditioning and storage unit coupled to the energy harvesting device, the voltage conditioning and storage unit configured to apply overvoltage and undervoltage protection to a storage capacitor;
   a controller coupled to the voltage conditioning and storage unit, the voltage conditioning and storage unit configured to apply overvoltage protection to the controller; and
   a motor control coupled to the controller, wherein the controller is configured to monitor an energy level of the storage capacitor and to actuate the motor control to fully open a damper if the controller determines that an amount of energy remaining on the storage capacitor reaches a predetermined amount.

2. The system of claim 1 further comprising a transceiver coupled to the controller, wherein the controller is configured to execute one or more commands received from the transceiver.

3. The system of claim 1 wherein the voltage conditioning and storage unit comprises a controller overvoltage protection unit coupled to the energy harvesting device and configured to protect the controller from overvoltages generated by the energy harvesting device.

4. The system of claim 1 wherein the voltage conditioning and storage unit comprises a long term storage capacitor and a short term storage capacitor.

5. The system of claim 4 wherein the voltage conditioning and storage unit comprises a capacitor overvoltage protection unit coupled to the long term storage capacitor and the short term storage capacitor and configured to protect the long term storage capacitor and the short term storage capacitor from overvoltages generated by the energy harvesting device and undervoltages generated by a motor.

6. The system of claim 1 wherein the motor control further comprises a motor current threshold detector configured to compare a motor current to a reference value and to generate a motor current threshold signal.

7. The system of claim 1 wherein the motor control further comprises a motor position sensor configured to measure sensor position data from a sensor disposed on a motor shaft.

8. The system of claim 1 wherein the controller further comprises a wake, measure and transceiver unit configured to wake the controller from an inactive state, to measure one or more sensors, to transmit the measured sensor data and to receive control data in response to the transmitted measured sensor data.

9. The system of claim 1 wherein the controller further comprises a default open control configured to measure a remaining amount of energy in an energy storage device and to cause a motor to fully open a damper if the remaining amount of energy is equal to or less than a predetermined value.

10. The system of claim 1 wherein the controller further comprises a start-up calibration unit configured to perform a start-up calibration sequence to determine a fully open and fully closed position of a damper.

11. A method for controlling a damper, comprising:
generating energy using an energy harvesting device;
applying overvoltage and undervoltage protection to a storage capacitor;
storing the generated energy in the storage capacitor; and
applying overvoltage protection to a controller;
controlling an operation of a damper position motor with the controller; and
actuating a motor control to using the controller fully open a damper if the controller determines that an amount of energy remaining on the storage capacitor has reached a predetermined amount.

12. The method of claim 11 further comprising executing one or more commands received from a transceiver with a controller after waking the controller from a power saving state.

13. The method of claim 11 further comprising comparing a motor current to a reference value and to generate a motor current threshold signal.

14. The method of claim 11 further comprising measuring sensor position data from a sensor disposed on a motor shaft.

15. The method of claim 11 further comprising:
waking a controller from an inactive state;
measuring one or more sensors using the controller;
transmitting the measured sensor data from the controller using a transceiver; and
receiving control data at the controller in response to the transmitted measured sensor data.

16. The method of claim 11 further comprising:
measuring a remaining amount of energy in an energy storage device; and
causing a motor to fully open a damper if the remaining amount of energy is equal to or less than a predetermined value.

17. The method of claim 11 further comprising performing a start-up calibration sequence to determine a fully open and fully closed position of a damper.

18. In a system having an energy harvesting device, a voltage conditioning and storage unit coupled to the energy harvesting device, the voltage conditioning and storage unit configured to apply overvoltage and undervoltage protection to a storage capacitor, a controller coupled to the voltage conditioning and storage unit, the voltage conditioning and storage unit configured to apply overvoltage protection to the controller, a motor control coupled to the controller, wherein the controller is configured to actuate the motor control to fully open a damper if an amount of energy remaining on the storage capacitor reaches a predetermined amount, a transceiver coupled to the controller, wherein the controller is configured to execute one or more commands received from the transceiver, wherein the voltage conditioning and storage unit comprises a controller overvoltage protection unit coupled to the energy harvesting device and configured to protect the controller from overvoltages generated by the energy harvesting device, wherein the voltage conditioning and storage unit comprises a long term storage capacitor and a short term storage capacitor, wherein the voltage conditioning and storage unit comprises a capacitor overvoltage protection unit coupled to the long term storage capacitor and the short term storage capacitor and configured to protect the long term storage capacitor and the short term storage capacitor from overvoltages generated by the energy harvesting device and undervoltages generated by a motor, wherein the motor control further comprises a motor current threshold detector configured to compare a motor current to a reference value and to generate a motor current threshold signal, wherein the motor control further comprises a motor position sensor configured to measure sensor position data from a sensor disposed on a motor shaft, wherein the controller further comprises a wake, measure and transceiver unit configured to wake the controller from an inactive state, to measure one or more sensors, to transmit the measured sensor data and to receive control data in response to the transmitted measured sensor data, wherein the controller further comprises a default open control configured to measure a remaining amount of energy in an energy storage device and to cause a motor to fully open a damper if the remaining amount of energy is equal to or less than a predetermined value, and wherein the controller further comprises a start-up calibration unit configured to perform a start-up calibration sequence to determine a fully open and fully closed position of a damper, a method comprising:
generating energy using an energy harvesting device;
applying overvoltage and undervoltage protection to a storage capacitor;
storing the generated energy in the storage capacitor; and
applying overvoltage protection to a controller;
controlling an operation of a damper position motor with the controller;
actuating a motor control to fully open a damper if an amount of energy remaining on the storage capacitor reaches a predetermined amount;
executing one or more commands received from a transceiver with a controller after waking the controller from a power saving state;
comparing a motor current to a reference value and to generate a motor current threshold signal;
measuring sensor position data from a sensor disposed on a motor shaft;
waking a controller from an inactive state;
measuring one or more sensors using the controller;
transmitting the measured sensor data from the controller using a transceiver;
receiving control data at the controller in response to the transmitted measured sensor data;
measuring a remaining amount of energy in an energy storage device;
causing a motor to fully open a damper if the remaining amount of energy is equal to or less than a predetermined value; and
performing a start-up calibration sequence to determine a fully open and fully closed position of a damper.

19. A method for controlling a motor-driven actuator, comprising:
- generating energy using an energy harvesting device selected from the group comprising a Peltier effect device, a microturbine and a solar photovoltaic cell;
- applying overvoltage and undervoltage protection to a storage capacitor using an overvoltage and undervoltage protection circuit configured to measure a voltage level at one or more capacitor terminals and to disconnect the storage capacitor from the energy harvesting device if the voltage is greater than a first voltage level and to connect the storage capacitor to the energy harvesting device if the voltage level is lower than a second voltage level;
- storing the generated energy in the storage capacitor; and
- applying overvoltage protection to a controller using the overvoltage and undervoltage protection circuit configured to measure a voltage level at one or more controller terminals and to disconnect the controller from the storage capacitor if the voltage is greater than a third voltage level; and
- controlling an operation of an actuator position motor with the controller as a function of the energy stored in the storage capacitor.

* * * * *

UNITED STATES PATENT AND TRADEMARK OFFICE
CERTIFICATE OF CORRECTION

PATENT NO. : 9,680,324 B2  
APPLICATION NO. : 14/641157  
DATED : June 13, 2017  
INVENTOR(S) : Josiah Wiley et al.

Page 1 of 1

It is certified that error appears in the above-identified patent and that said Letters Patent is hereby corrected as shown below:

In the Claims

1. In Column 9, Line 26, in Claim 11, delete "capacitor; and" and insert -- capacitor; --, therefor.

2. In Column 9, Line 30, in Claim 11, delete "to using the controller" and insert -- using the controller to --, therefor.

3. In Column 11, Line 15, in Claim 19, delete "capacitor; and" and insert -- capacitor; --, therefor.

Signed and Sealed this  
Twelfth Day of September, 2017

Joseph Matal  
*Performing the Functions and Duties of the*  
*Under Secretary of Commerce for Intellectual Property and*  
*Director of the United States Patent and Trademark Office*